(12) United States Patent
Ryai, Sr. et al.

(10) Patent No.: US 8,851,809 B2
(45) Date of Patent: Oct. 7, 2014

(54) METHOD AND APPARATUS FOR HOLDING KEYS DURING THE CUTTING PROCESS

(75) Inventors: Richard W. Ryai, Sr., North Royalton, OH (US); David Kaufman, Beachwood, OH (US)

(73) Assignee: Hy-Ko Products Company, Northfield, OH (US)

( * ) Notice: Subject to any disclaimer, the term of this patent is extended or adjusted under 35 U.S.C. 154(b) by 494 days.

(21) Appl. No.: 13/179,250

(22) Filed: Jul. 8, 2011

(65) Prior Publication Data

US 2012/0014762 A1   Jan. 19, 2012

Related U.S. Application Data

(60) Provisional application No. 61/364,228, filed on Jul. 14, 2010.

(51) Int. Cl.
*B23C 3/35* (2006.01)

(52) U.S. Cl.
CPC .. *B23C 3/355* (2013.01); *B23C 3/35* (2013.01)
USPC ........................................................ 409/81

(58) Field of Classification Search
CPC ........ B23C 2235/00; B23C 3/35; B23C 3/355
USPC ............... 409/81, 82, 83; 206/37.1, 37.8, 349
IPC .......................................................... B23C 3/35
See application file for complete search history.

(56) References Cited

U.S. PATENT DOCUMENTS

| | | | | |
|---|---|---|---|---|
| 3,796,130 A | * | 3/1974 | Gartner | 409/83 |
| 4,051,748 A | * | 10/1977 | Sherman | 76/110 |
| 4,969,782 A | * | 11/1990 | Castain | 409/81 |
| 5,360,299 A | * | 11/1994 | Oliana | 409/83 |
| 6,033,164 A | * | 3/2000 | Hoffman et al. | 409/81 |
| 2004/0095380 A1 | * | 5/2004 | Bass et al. | 345/738 |
| 2005/0135891 A1 | * | 6/2005 | Ryai et al. | 409/81 |
| 2007/0217880 A1 | * | 9/2007 | Ryai, Sr. | 409/81 |
| 2008/0226408 A1 | * | 9/2008 | Belflower et al. | 409/131 |

FOREIGN PATENT DOCUMENTS

AU           708996 B   *   8/1999   ............... B23C 3/35

OTHER PUBLICATIONS

My Security Pro. "Z-Keyway Adapter for Cutting B106, B106-P, and B111-PT." Jul. 7, 2010.*
Price that Tool. "Cutting Adapter FOA-1 by Jet Hardware Manufacturing." Jul. 7, 2010.*
AAble Locksmiths. "Instructions to Use AAble Key Adapters." Aug. 5, 2011.*
Instructions for Use of Aable Key Adaptors, Aable Locksmiths, 47 Marlboro Drive, Milford, CT 06461.

* cited by examiner

*Primary Examiner* — Daniel Howell
*Assistant Examiner* — Michael Vitale
(74) *Attorney, Agent, or Firm* — Calfee, Halter & Griswold LLP

(57) ABSTRACT

A method and apparatus for holding a key or key blank while copying a key including at least one holder having an opening configured to at least partially enclose at least two sides of a keyway is provided herein. The opening of the holder includes at least one longitudinal groove or one longitudinal protrusion configured to mate with at least one longitudinal protrusion or longitudinal groove of the keyway. A user slides a first holder over the keyway of a key blank, and a second holder over a keyway of a key to be copied and places the holders into clamping jaws of a key cutting machine prior to copying a key.

19 Claims, 3 Drawing Sheets

METHOD AND APPARATUS FOR HOLDING KEYS DURING THE CUTTING PROCESS

CROSS REFERENCE TO RELATED APPLICATIONS

This application claims the benefits of and priority to U.S. Provisional Pat. Application Ser. No. 61/364,228 titled "Method and Apparatus for Holding Keys During The Cutting Process" filed on Jul. 14, 2010. This provisional patent application is incorporated herein in its entirety.

TECHNICAL FIELD

This invention relates to a method and apparatus for holding keys during the cutting process.

BACKGROUND

Some keys have keyway configurations that make it difficult to accurately and reliably position the key into clamping jaws of a key cutting machine. For example, several key manufactures make a key that has a "Z-Keyway." Keys with Z-Keyways are difficult to position and hold in the clamping jaws of a key cutting machine because the grooves that run along the front and back sides of the key blades are offset. One attempt to solve this problem is through use of a metal adaptor that is substantially flat with a longitudinal protrusion that runs the length of the adaptor. The metal adaptor is intended to be reused for the cutting of many keys. This metal adaptor is expensive, difficult to use, and easily lost.

SUMMARY

An adaptor for holding a key and a key blank in a key cutting machine while copying the key is disclosed herein. The adaptor includes a first holder having a first opening configured to at least partially enclose two sides of a blade of a key, the first opening includes at least one longitudinal groove or one longitudinal protrusion configured to mate with at least one longitudinal protrusion or longitudinal groove of the blade of the key. In addition, the adaptor includes a second holder having a second opening configured to at least partially enclose two sides of a key blank, the second opening also includes at least one longitudinal groove or one longitudinal protrusion configured to mate with at least one longitudinal protrusion or longitudinal groove of the blade of a key blank. The adaptor allows an accurate copy to be made of keys that are difficult to hold in the clamp jaws of the key cutting machine.

Other features and advantages of the invention will be apparent from the description and drawings, and from the claims.

DETAILED DESCRIPTION

Figure 1:
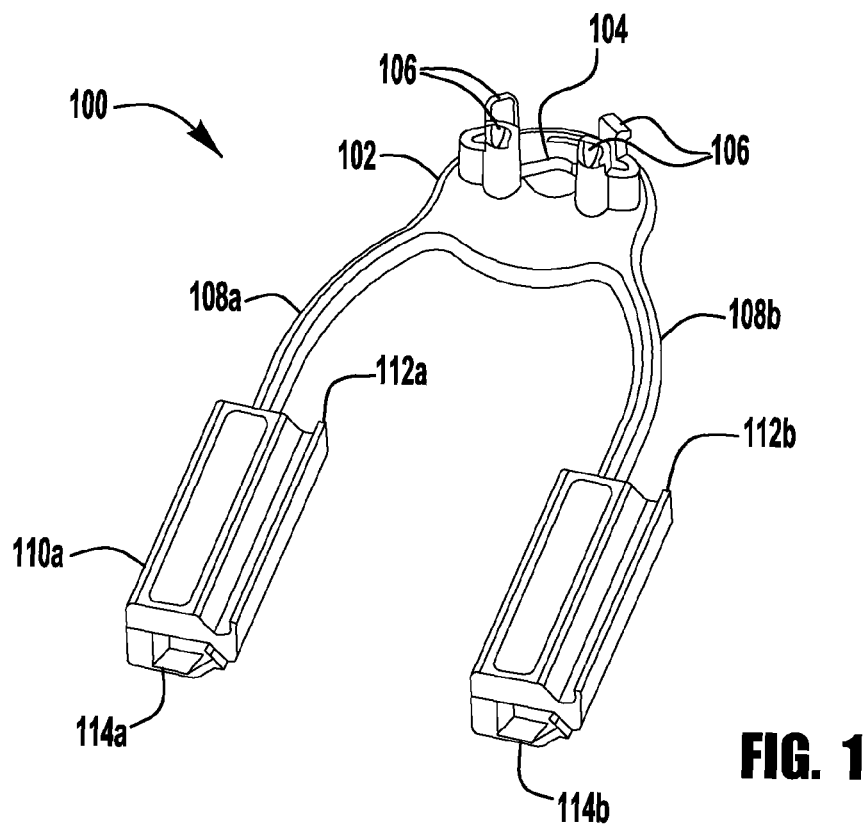
FIG. 1 is a prospective view of an adaptor having two holders, one for holding a key and one for holding a key blank. The two holders are attached in a wishbone configuration.
Figure 2:
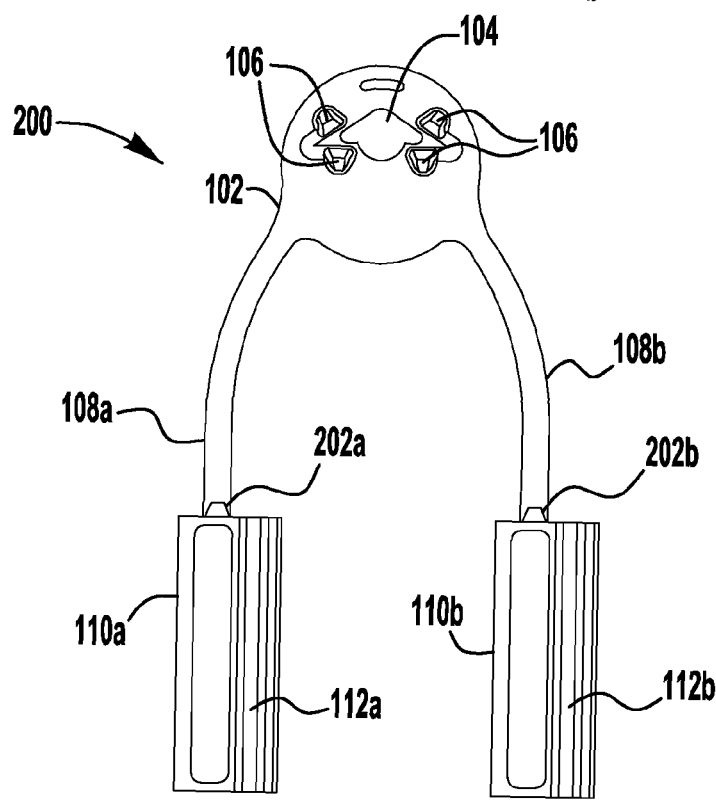
FIG. 2 is front view of the adaptor of FIG. 1.
Figure 3:
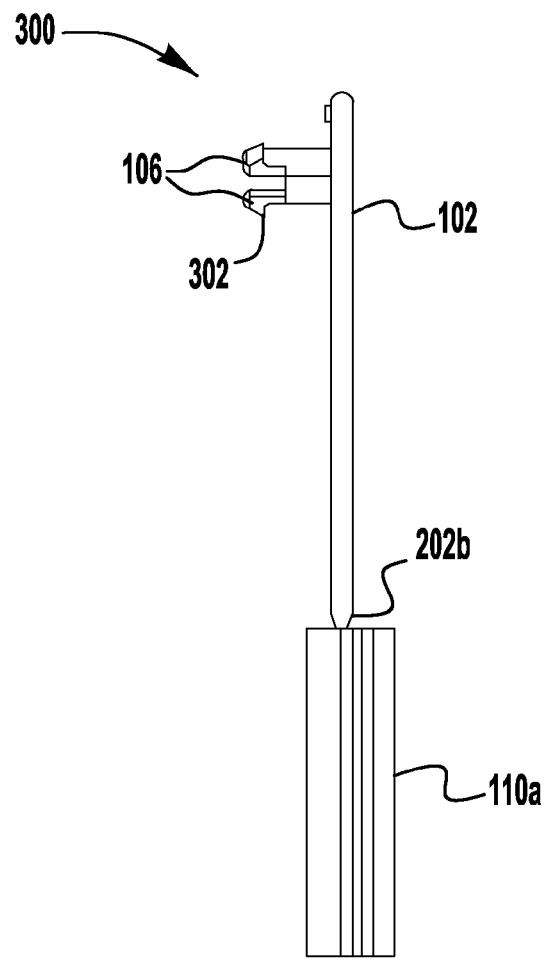
FIG. 3 is a side view of the adaptor of FIG. 1.

Objects having the same number, but with different suffixes "a" and "b" are substantially the same and accordingly, in the detailed description herein a description of an object, for example, object 108a, is the same description for object 108b, unless noted otherwise. Accordingly, objects having a number that ends in the suffix "b," may not be separately described herein. Similarly, objects having the same number in different figures are substantially the same and accordingly are not re-described with respect to the later figures.

FIGS. 1-4 illustrate an embodiment of an adapter for holding a key and a key blank during a cutting process to duplicate or copy the key. Wishbone adaptor 100 includes a body 102, legs 108a, 108b, and holders 110a and 110b. Body 102 also includes connectors 106 and a hole 104 located in the center of body 102. Preferably wishbone adaptor 100 is made of a plastic material, such as for example, polyvinyl chloride ("PVC"), making them relatively inexpensive to mass produce, and in one embodiment, disposable after use.

Holders 110a and 110b are preferably releasably secured to wishbone connector 100. In one embodiment, grooves 202a, 202b (FIGS. 2 and 3) facilitate the releasability of holders 110a, 110b from legs 108a, 108b. Grooves 202a and 202b are frangible areas of reduced cross-section that allows holders 110a, 110b to be bent back and forth in the area of reduced cross-section and broken off of legs 108a, 108b.

It may be desirable to ship wishbone adapter 100 along with a key blank (not shown), and accordingly, wishbone adaptor 100 includes one or more connectors 106 for connecting the wishbone adapter 100 to a key blank (not shown). In one embodiment, one or more connectors 106 are configured to snap fit into a hole on a key blank (not shown). Connectors 106 are upwardly standing projections that include at least a portion of a tapered flange 302. When the connectors 106 are pressed into the hole in a key blank, the upwardly standing projections deflect inward as the tapered flange 302 passes through the hole in the key blank and spring back to their normal position after the tapered flange 302 passes through the hole in the key. After springing back to their normal position, the outside diameter of tapered flanges 302 on connectors 106 extend beyond the edge of the key hole and cannot easily be pulled back through the hole in the key blank. Accordingly, the wishbone adaptor 100 is securely, but releasably, connected to the key blank. In one embodiment, wishbone adaptor 100 has a hole 104 between connectors 106. Hole 104 is configured to allow the key blank, with wishbone adaptor 100 connected thereto, to slide over a hook at the retailer's location.

Other types of connectors are contemplated herein, such as, for example, connectors that fit through a round hole in a key blank, or connectors that secure around outside edges of the key blank or key bow. In addition, other configurations for securing the wishbone adaptor 100 to the key blank are also contemplated herein, such as, for example, an adhesive, a two part connector that snaps together and connects through the hole in the key blank, or around an outside portion of the key blank. Thus, as well as being capable of being sold separately, wishbone adaptor 100 may be secured to a key blank at or about the time of manufacturing and shipped along with the key blank to its final destination.

Holders 110a and 110b are substantially identical. In one embodiment, holder 110a has an open area that includes a plurality of longitudinal projections, 402a, and 406a, and a longitudinal groove 408. Preferably, the longitudinal groove and longitudinal projections extend the length of holder 110a. The open area is configured to receive the blade of a key (or key blank). The longitudinal groove 408a and projections 402a, 406a match in a mating fashion with projections and grooves in the key or key blank (not shown). In one embodiment, the longitudinal projections, 402a, 406a and the longitudinal groove 408 are configured to mate with the grooves in a "z-key." Accordingly, the key and key blanks may be identically positioned with respect to the holders 110a, 110b.

In operation, wishbone adaptor 100 is connected to a key blank (not shown) after manufacture by pressing connectors 106 into the hole in the key blank. The key blank and wishbone adaptor 100 are shipped through a distribution system to a retailer. When a customer requests a copy of a key, the sales person obtains the proper key blank, which has wishbone adaptor 100 connected to it. The sales person snaps off holders 110a, and 110b and disregards the rest of wishbone adaptor 100. Holder 110a is used to hold the master key (customer's key) and the second holder 110b is used to hold the key blank. The open area is configured to receive the blade of the master key (or the key blank). The sales person slides holder 110a over the master key and slides holder 110b over the key blank. The longitudinal groove 408a, and projections 402a and 406a are aligned with the mating groove and projections in the master key respectively. The longitudinal groove 408b and projections 402b and 406b are aligned with the mating grooves and projections in the key blank respectively.

The sales person then places the customer's key and holder 110a in a first set of clamping jaws, which has a protrusion that fits into groove 112a. The sales person places the key blank and holder 110b in the second set of clamping jaws, which also has a protrusion that fits into groove 112b. Groves 112a, 112b ensure holder 110a, 110b are identically positioned in their respective jaws, the key and key blanks are identically positioned with respect to the holders 110a, 110b, and with respect to the clamping jaws. As a result, an accurate copy of the customer's key can be readily made by known key cutting machines used to duplicate keys.

Figure 4:
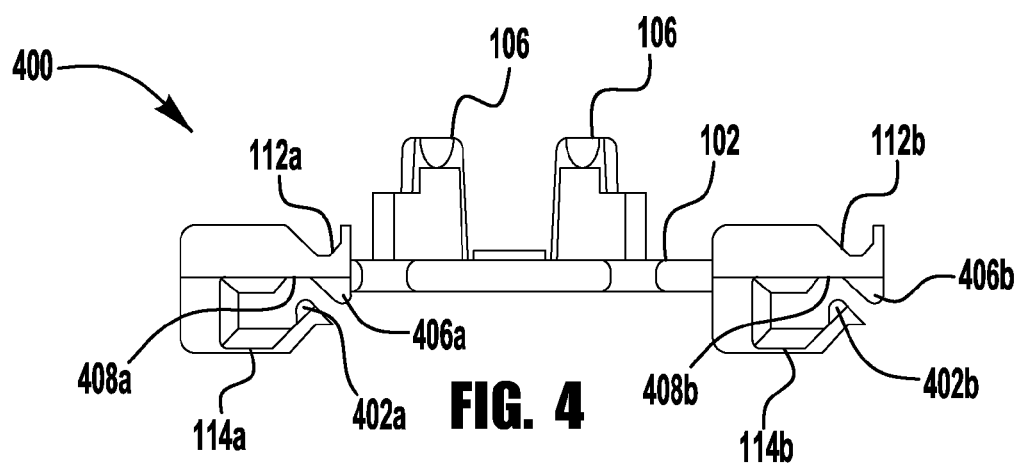
FIG. 4 is an end view of the adaptor of FIG. 1.

The embodiment illustrated in FIG. 4, is for a Z-Keyway having a z-key jaw. Other embodiments for different keyways, different clamping jaws, and combinations thereof are contemplated herein.

Figure 5:
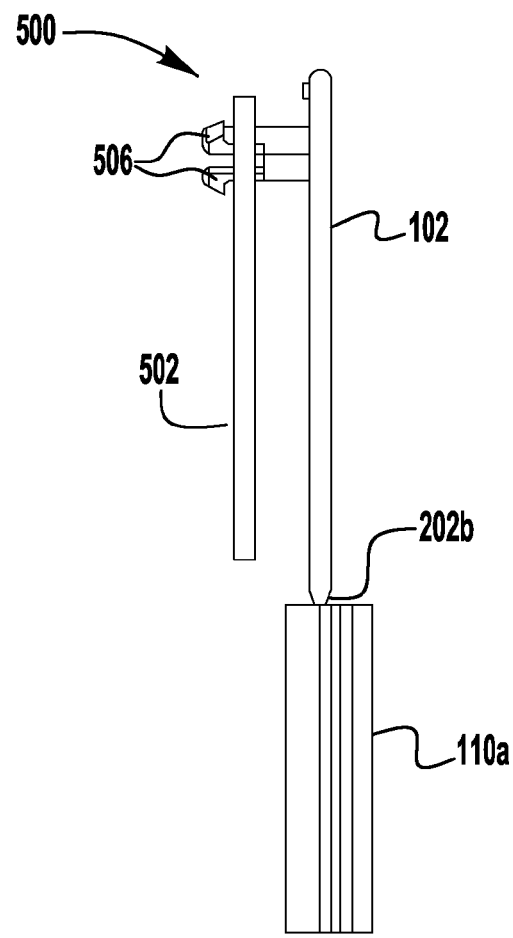
FIG. 5 is a side view of an adaptor having two holders connected to a data source.

FIG. 5 illustrates another embodiment of wishbone adaptor 500. Wishbone adaptor 500 is substantially the same as wishbone adaptor 100, however, connectors 506 have been modified. Connectors 506 are configured to pass through a hole in a key blank and connect to a data source 502. Connectors 506 may be similar to connectors 106, but longer so that they may also pass through a hole in data source 502. Optionally, data source 502 may have a connector (not shown) that mates with, or snaps onto, connector 506.

Data source 502 is a media capable of conveying data. Data source 502 may be made of any suitable material, such as, for example, cardboard or plastic. Data source 502 may be a card with written instructions. Those written instructions may include, for example, how to connect the holders to the key and key blank and positioned them in the key cutting machine when making a copy of the key. In one embodiment, data source 502 includes an electronic information storage device containing coded instructions that are machine readable. These instructions may be read by a computer and displayed for a user/sales person to follow. These instructions may include, for example, instructions on how to position the key and key blanks in the cutting machine, instructions to obtain the customer's identification information, instructions on the proper forms to fill out, instructions to offer the customer promotional deals or discounts on additional keys or other related items, such as, key chains, and bow covers. Additional information may include the type of key blank, an origination address, a destination address, a manufacturer, a manufacturing date, and/or a lot number.

Figure 6:
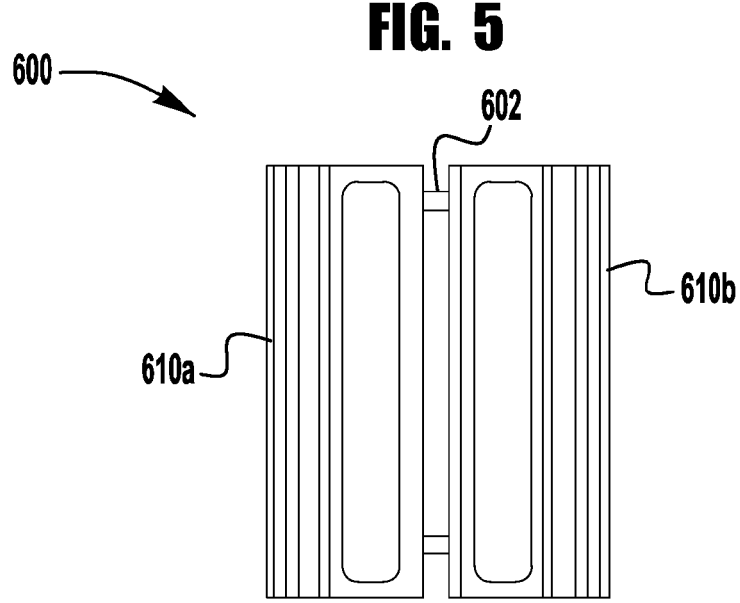
FIG. 6 is another embodiment of a front view an adaptor having two holders for holding a key and a key blank.

FIG. 6 illustrates another embodiment of an adaptor 600. Holders 610a, 610b are substantially identical to holders 110a, 110b. Holders 610a, 610b are releasably connected to one another by legs 602. In this embodiment, holders 610a, 610b may be connected to a key blank (not shown) for shipping by sliding one of the holders 610a, 610b over the blade of the key blank. Holders 610a, 610b are substantially the same as holders 110a, 110b described above.

It should also be clear from this disclosure that the present invention has numerous additional uses outside of the key industry. The present invention is equally applicable to other applications wherein the tracking of inventory of a multitude of like but not identical products through manufacturing, distribution and retailing systems.

In addition, while the present invention has been illustrated by the description of embodiments thereof, and while the embodiments have been described in some detail, it is not the intention of the applicant to restrict or in any way limit the scope of the appended claims to such detail. Additional advantages and modifications will readily appear to those skilled in the art. For example, various configurations of the adaptor may be used to match different keys having different characteristics, as well as to match different clamping jaws of different key cutting machines, and are contemplated herein. Therefore, the invention in its broader aspects is not limited to the specific details, representative apparatus and methods, and illustrative examples shown and described. Accordingly, departures may be made from such details without departing from the spirit or scope of the applicant's general inventive concept.

We claim:

1. An adaptor for holding a key or key blank while copying a key comprising:
   a first holder having a first opening configured to at least partially enclose at least two sides of a blade of a key, the first opening having at least one longitudinal groove or one longitudinal protrusion configured to mate with at least one corresponding longitudinal protrusion or longitudinal groove of the blade of the key;
   a longitudinal groove on an outer surface of the first holder, wherein when the first holder is placed in a first set of clamping jaws of a key cutting machine, a protrusion on the first set of clamping jaws engages the longitudinal groove on the outer surface of the first holder; and
   a second holder having a second opening configured to at least partially enclose at least two sides of the blade of a key blank, the second opening having at least one longitudinal groove or one longitudinal protrusion configured to mate with at least one corresponding longitudinal protrusion or longitudinal groove of the blade of a key blank:
   a longitudinal groove on an outer surface of the second holder, wherein when the second holder is placed in a second set of clamping jaws of a key cutting machine, a protrusion on the second set of clamping jaws engages the longitudinal groove on the outer surface of the second holder.

2. The adaptor of claim 1 further comprising a connector to connect the first holder to the second holder.

3. The adaptor of claim 2 wherein the connector is releasably connected to at least one of the first or second holders.

4. The adaptor of claim 2 wherein the connector further comprises a connector for connecting the adaptor to a key blank.

5. The adaptor of claim 2 wherein the first and second holders are configured to hold a z-key.

6. An assembly comprising:
a key blank,
an adaptor including a first and second holder,
the first and second holders having a longitudinal groove on an outer surface for engaging jaws of a key cutting machine; and
a connector connecting the adapter to the key blank.

7. The assembly of claim 6 wherein at least one of the first and second holders are separable from the adaptor.

8. The assembly of claim 6 wherein the first and second holders are configured to hold a z-key or z-key blank.

9. The assembly of claim 6 further comprising a data source.

10. The assembly of claim 9 wherein the data source includes instructions on at least one of (a) how to position the key and key blank in the holders: (b) instructions to obtain customer information; (c) instructions on promotional deals or discounts; (d) the type of key blank, (e) an origination address, (f) a destination address, (g) a manufacturer, (h) a manufacturing date, and (i) a lot number.

11. The assembly of claim 10 wherein the data source is an electronic information storage device.

12. The assembly of claim 11 wherein the data source is connected to the adaptor.

13. The assembly of claim 11 wherein the data source is embedded at least partially within the adaptor.

14. An adaptor for holding a z-key or z-key blank while copying a z-key comprising:
a first holder having a first opening configured to at least partially enclose at least two sides of a blade of a z-key,
a longitudinal groove on an outer surface of the first holder, wherein when the first holder is placed in a first set of clamping jaws of a key cutting machine, a protrusion on the first set of clamping jaws engages the longitudinal groove on the outer surface of the first holder; and
a second holder having a second opening configured to at least partially enclose at least two sides of the blade of a z-key blank; and
a longitudinal groove on an outer surface of the second holder, wherein when the second holder is placed in a second set of clamping jaws of a key cutting machine, a protrusion on the second set of clamping jaws engages the longitudinal groove on the outer surface of the second holder.

15. The adaptor of claim 14 further comprising a connector to connect the first holder to the second holder.

16. The adaptor of claim 15 wherein the connector is releasably connected to at least one of the first or second holders.

17. The adaptor of claim 14 further comprising a data source connected to the adaptor.

18. The adaptor of claim 17 wherein the data source includes instructions on one or more of a) how to position the key and key blanks in the cutting machine, b) instructions to obtain the customer's identification information, c) instructions on the proper forms to fill out, and d) instructions to offer the customer promotional deals or discounts on additional keys or other related items.

19. The adaptor of claim 14 further comprising a key blank secured to the adaptor.

* * * * *